United States Patent
Dhandapani

(10) Patent No.: US 10,674,189 B2
(45) Date of Patent: Jun. 2, 2020

(54) METHODS, SYSTEMS, AND DEVICES FOR PROVIDING A VIDEO TRAILER FOR MEDIA CONTENT DURING A VOICE COMMUNICATION SESSION

(71) Applicant: AT&T INTELLECTUAL PROPERTY I, L.P., Atlanta, GA (US)

(72) Inventor: Vignesh Gurunatha Dhandapani, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/630,634

(22) Filed: Jun. 22, 2017

(65) Prior Publication Data

US 2018/0376171 A1 Dec. 27, 2018

(51) Int. Cl.
| | |
|---|---|
| *H04N 21/239* | (2011.01) |
| *G06F 3/048* | (2013.01) |
| *G06F 21/31* | (2013.01) |
| *H04Q 11/04* | (2006.01) |
| *H04L 29/06* | (2006.01) |
| *H04N 21/8549* | (2011.01) |
| *H04N 21/858* | (2011.01) |
| *H04N 21/81* | (2011.01) |
| *H04N 21/2543* | (2011.01) |

(52) U.S. Cl.
CPC .......... *H04N 21/239* (2013.01); *G06F 3/048* (2013.01); *G06F 21/313* (2013.01); *H04L 65/1006* (2013.01); *H04L 65/1016* (2013.01); *H04L 65/1063* (2013.01); *H04L 65/1069* (2013.01); *H04L 65/1096* (2013.01); *H04N 21/2543* (2013.01); *H04N 21/8106* (2013.01); *H04N 21/8549* (2013.01); *H04N 21/8586* (2013.01); *H04Q 11/0478* (2013.01)

(58) Field of Classification Search
CPC ..... H04N 21/239; G06F 3/048; G06F 21/313; H04Q 11/0478
USPC .......................................................... 386/248
See application file for complete search history.

(56) References Cited

U.S. PATENT DOCUMENTS

| | | | |
|---|---|---|---|
| 8,407,623 B2 | 3/2013 | Kerr et al. | |
| 9,084,089 B2 | 7/2015 | Borchers et al. | |
| 2002/0172368 A1* | 11/2002 | Peterka | H04N 7/165 380/278 |
| 2003/0110503 A1* | 6/2003 | Perkes | H04N 7/17318 725/86 |

(Continued)

FOREIGN PATENT DOCUMENTS

| | | |
|---|---|---|
| WO | 2015183647 | 12/2015 |
| WO | 2016/040052 | 3/2016 |

*Primary Examiner* — Thai Q Tran
*Assistant Examiner* — Nienru Yang
(74) *Attorney, Agent, or Firm* — Guntin & Gust, PLC; Atanu Das

(57) ABSTRACT

Aspects of the subject disclosure may include, for example, embodiments can include initiating a voice call to a communication device utilized by a subscriber of a media content service. The voice call indicates a video trailer for media content is available for viewing by the subscriber. Further embodiments can include receiving a first request to present the video trailer for the media content in response to the voice call. Additional embodiments can include providing the video trailer to the communication device. Other embodiments are disclosed.

20 Claims, 8 Drawing Sheets

(56) References Cited

U.S. PATENT DOCUMENTS

| | | |
|---|---|---|
| 2007/0217579 A1* | 9/2007 | Sobti .................... H04M 3/533 |
| | | 379/67.1 |
| 2008/0182561 A1 | 7/2008 | Kim et al. |
| 2008/0227435 A1* | 9/2008 | Six .......................... H04L 67/02 |
| | | 455/414.1 |
| 2012/0113978 A1* | 5/2012 | Cerami ............... H04M 1/2535 |
| | | 370/352 |
| 2013/0155323 A1* | 6/2013 | Segal .................... H04N 5/445 |
| | | 348/563 |
| 2014/0243028 A1 | 8/2014 | Colombo et al. |
| 2014/0278951 A1* | 9/2014 | O'Connor .......... G06Q 30/0251 |
| | | 705/14.49 |
| 2015/0156618 A1 | 6/2015 | Martinez et al. |
| 2015/0317017 A1 | 11/2015 | Fernandez |
| 2016/0036881 A1 | 2/2016 | Tembey et al. |
| 2016/0275187 A1 | 9/2016 | Chowdhury et al. |

* cited by examiner

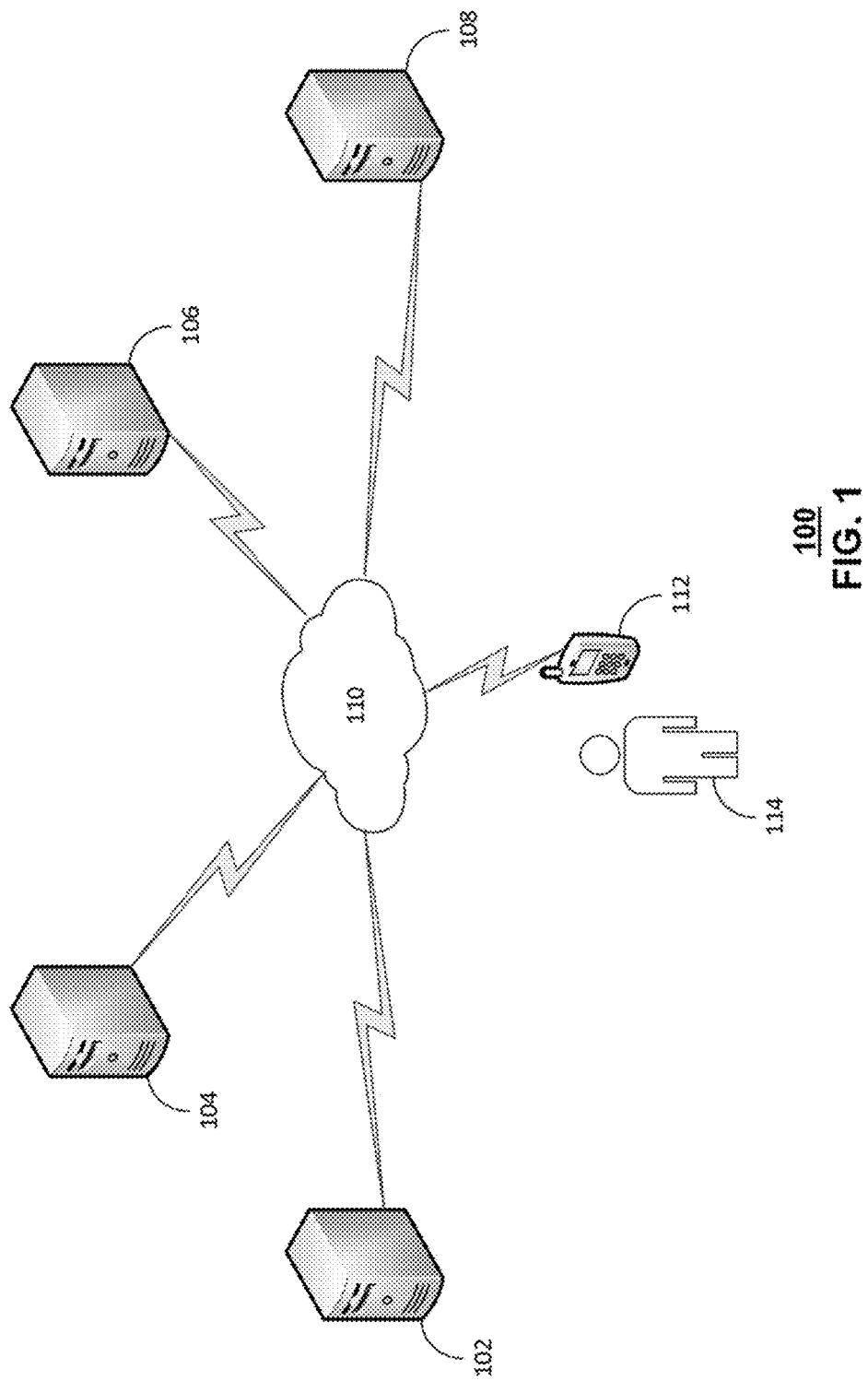

METHODS, SYSTEMS, AND DEVICES FOR PROVIDING A VIDEO TRAILER FOR MEDIA CONTENT DURING A VOICE COMMUNICATION SESSION

FIELD OF THE DISCLOSURE

The subject disclosure relates to a methods, systems, and devices for providing a video trailer for media content during a voice communication session.

BACKGROUND

Users subscribe to media content services to view media content. These media content service providers can be stand-alone Internet media service providers or media content services provided by a cable television or satellite television provider. In addition, a cable television or satellite television provider can provide some of their media content over the Internet in addition to over cable or satellite technology. Further, media content service providers present video trailers of media content to subscribers or potential subscribers. Video trailers are a marketing tool to entice subscribers or potential subscribers to purchase media content or subscriptions to media content services.

BRIEF DESCRIPTION OF THE DRAWINGS

Reference will now be made to the accompanying drawings, which are not necessarily drawn to scale, and wherein:

FIG. 1 depicts an illustrative embodiment of a system for providing a video trailer for media content during a voice communication session;

DETAILED DESCRIPTION

Figure 2A:
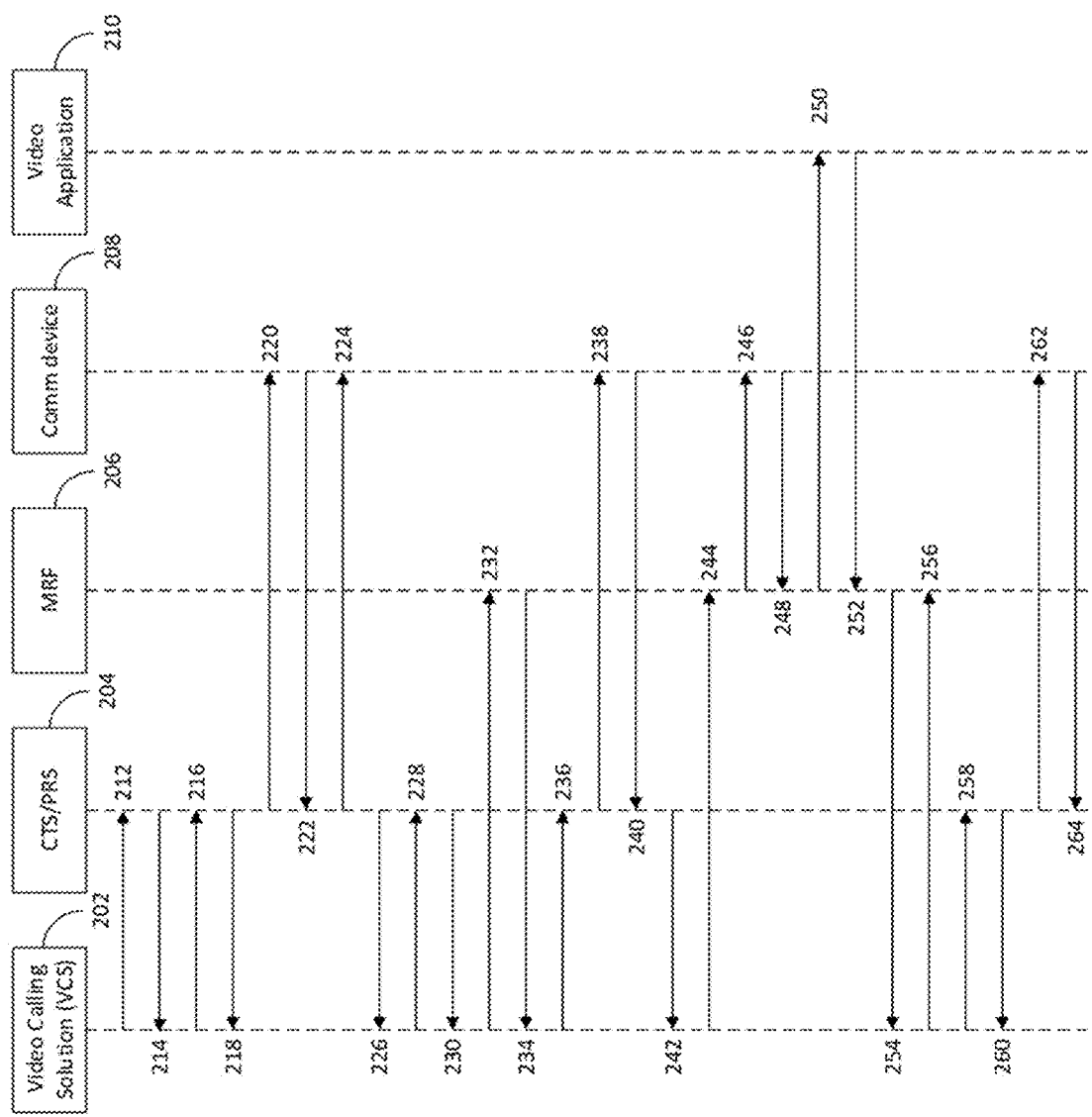
FIG. 2A depicts an illustrative embodiment for a transition diagram of a system for providing a video trailer for media content during a voice communication session.

The subject disclosure describes, among other things, illustrative embodiments initiating a voice call to a communication device utilized by a subscriber of a media content service. The voice call indicates a video trailer for media content is available for viewing by the subscriber. Further embodiments can include receiving a first request to present the video trailer for the media content in response to the voice call. Additional embodiments can include providing the video trailer to the communication device. Other embodiments are described in the subject disclosure.

One or more aspects of the subject disclosure include a device. The device comprises a processing system including a processor and a memory that stores executable instructions that, when executed by the processing system, facilitate performance of operations. Operations can include initiating a voice call to a communication device utilized by a subscriber of a media content service. The voice call indicates a video trailer for media content is available for viewing by the subscriber. Further operations can include receiving a first request to present the video trailer for the media content in response to the voice call. Additional operations can include providing the video trailer to the communication device.

One or more aspects of the subject disclosure include a machine-readable storage medium, comprising executable instructions that, when executed by a processing system including a processor, facilitate performance of operations. Operations can include receiving, at a communication device, a voice call via a converged telephony server from a video call solution function. The voice call indicates one or more video trailers is available for viewing by a subscriber. The CTS is a network element of an IP Multimedia Subsystem that provides call processing services. Further operations can include providing first user-generated input from the communication device to the video call solution function that includes a first request to present a video trailer on the communication device for media content from the one or more video trailers on the media content provider's server. Additional operations can include presenting the video trailer on the communication device.

One or more aspects of the subject disclosure include a method. The method includes receiving, by a processing system including a processor, a storage location for a video trailer and media content. The processing system includes and operates a media resource function. Further, the method can include providing, by the processing system, the video trailer in response to receiving a first user-generated input. The first user-generated input is provided by a communication device in voice communication with a converged telephony server (CTS). The voice communication indicates the video trailer for media content is available for viewing by a subscriber. The first user-generated input includes first request for the video trailer. The CTS is a network element of an IP Multimedia Subsystem that provides call processing services.

FIG. 1 depicts an illustrative embodiment of a system 100 for providing a video trailer for media content during a voice communication session. In one or more embodiments, the system 100 can include a video call solution (VCS) function 102 implemented by a computing device. Further, the system 100 can include a converged telephony server (CTS)/parley rest server (PRS) 104. In addition, the system 100 can include media resource function (MRF) 106 implemented by a computing device. Also, the system 100 can include a media content server 108. Further, the system 100 can include communication device 112 associated with a user 114. The user 114 can be a subscriber to media content services from a media content service provider. In additional embodiments, the media content server 108 can be operated by the media content service provider. In further embodiments, one, some or all of the VCS 102, CTS/PRS 104, MRF 106, and media content server 108 can be operated by a media content service provider. In some embodiments, the VCS function 102, CTS/PRS 104, the MRF 106, and the media content server 108 can be integrated in one computing device. In other embodiments, the VCS function 102, CTS/PRS 104, the MRF 106, and the media content server 108 can be distributed among one or more computing devices, individually, collectively, or in some combination. In further embodiments the communication device 112 can be a wearable computing device, mobile phone, tablet computer, laptop computer, desktop computer, media device, or any other communication device.

The CTS is a telephony feature server built around standard session initiation protocol (SIP) and IP Multimedia Subsystem (IMS) interfaces. In the IMS architecture, CTS (an application server) is present in the application layer which provide the end-user service logic that provides both basic and advanced call processing services such as call forwarding, network-based progressive conference, and so on. The overall architecture for CTS is based on the set of functions and interfaces defined for the IMS architecture. A virtual CTS system is composed of a number of CTS-related "Virtual Appliances" (VA) that is, virtual machines running CTS related software. The CTS described herein can be a virtual CTS.

The PRS is one of vCTS' virtual appliances which exposes APIs that follows the RESTful Network API standard. The PRS handles the API interpretation, call processing, call event subscriptions etc. NC-API is a collection of Call-control, call-direction and call-notification APIs. The PRS described herein can be a virtual PRS.

The MRF provides media related functions such as media manipulation (e.g. voice stream mixing) and playing of tones and announcements. The MRF is further divided into a media resource function controller (MRFC) and a media resource function processor (MRFP). The MRFC is a signaling plane node that interprets information coming from an AS and S-CSCF to control the MRFP. The MRFP is a media plane node used to mix, source or process media streams. It can also manage access right to shared resources. The MRF described herein can be a virtual MRF.

In one or more embodiments, the VCS function 102 can initiate a voice call or a voice communication session with a subscriber via the CTS/PRS 104 and the communication device 112. In some embodiments, the PRS functions of the CTS/PRS 104 can include o a set of application programming interfaces (APIs) for various functions. The VCS 102 can initiate the voice call or voice communication session using a click-to-dial API of the CTS/PRS 104. In response to receiving instructions via the click-to-dial API, the CTS/PRS generates the voice call or voice communication session with the communication device 112. Embodiments can include the VCS using other types of messages or messaging techniques to provide the CTS/PRS 104 to generate the voice call or voice communication session. In other embodiments, the voice call or voice communication session can be conducted using a voice-over-Internet Protocol (VoIP) technology. In further embodiments, the voice call or voice communication session can be conducted using plain old telephone service (POTS) technology.

In one or more embodiments, during the voice call or voice communication session between the VCS 102 and the subscriber 114, the VCS 102 can indicate in a recording or an audio prompt/announcement that a video trailer for content is available for viewing by the subscriber 114. In some embodiments, the voice call or voice communication session can be equipped with Interactive Voice Response (IVR) technology. That is, the voice call or voice communication session provide options for the subscriber 114 to request or access the video trailer and the subscriber can use voice recognition techniques or input dual tone multi-frequency (DTMF) tones via a keypad to select an option. Further, options can include the communication device 112 receiving the video trailer immediately or another option can be receiving the video trailer at a future time. Additional options can include receiving an URL link to access the video trailer in a text message, email message, or social media message. Also, options can include streaming or downloading the video trailer to the communication device 112 in lieu of sending the URL link or in response to selecting the URL link. Further, the VCS function 102 can send a message to the MRF 106 to provide the video trailer to the communication device 112 in response to the request to access and/or view the video trailer. The request can be in a voice message that is recognized by voice recognition techniques or IVR technology, DTMF tones provided by the keypad of the communication device 112 and recognized by IVR technology, selecting of the URL link or other user-generated input from an input device (touchscreen, mouse, keyboard, etc.).

In one or more embodiments, the VCS function 102 or the MRF 106 can initiate a text message, email message, or social media message to the communication device 112 without a prior voice call or voice communication session that includes an URL link to access the video trailer.

In one or more embodiments, the CTS/PRS 104 can receive a request from the subscriber to present the video trailer of the media content. Further, the CTS/PRS 104 can notify the VCS function 102 of the request for the video trailer. In some embodiments, the VCS function 102 can use session-initiated-protocol (SIP) request or message to communicate with the MRF 106. In further embodiments, the SIP request or message can include session-description-protocol (SDP) that is part of SIP that identifies the audio coder-decoder (codec) and/or video codec for the communication device. Audio codec and video codec information of the communication device 112 is used by the MRF 106 or the media content server 108 to provide the video trailer in a format compatible with the communication device 112. In other embodiment, the SIP request or message can include an URL or other indication of a storage location of the video trailer and/or media content (URL is storage location). The URL or other storage location indication can indicate that the video trailer and/or media content is stored at the media content server 108, or at a database of media content repository accessible by the media content server 108.

In one or more embodiments, in response to receiving the SIP request or other message to provide the video trailer to the communication device, the MRF 106 can provide instructions in a message or notification to the media content server 108 to provide the video trailer to the communication device 112 to be viewed by the subscriber 114 (according to an URL link or the storage location provided by the VCS 102). The media content server 108 can stream or download the video trailer to the communication device 112. In other embodiments, the MRF 106 or media content server 108 can provide the URL link or the storage location to the communication device 112 in a text message, email message, social media message that can be selected the subscriber 114 via user input to access the video trailer. Accessing by the communication device 112 the video trailer can include streaming the video trailer or downloading the video trailer.

In one or more embodiments, the MRF 106 and/or media content server 108 can prompt the subscriber 114 via a user interface on the communication device 112 to select one or more options to view, store, or otherwise access the media content. In some embodiments, the subscriber can provide user-generated input to the MRF 106 or media content server 108 to have the MRF 106 or media content server 108 to stream or download the media content to the communication device 112. In other embodiments, the subscriber can provide user-generated input to the MRF 106 or media content server 108 to store the media content in a digital video recorder (DVR) or other storage device that is accessible by the communication device at a later time. In further embodiments, the subscriber can provide user-generated input to the MRF 106 or media content server 108 to store the media content in wishlist or playlist associated with the subscriber 114 that can be accessed by the communication device 112 or another computing device associated with the subscriber.

In one or more embodiments, the VCS function 102 can access a user profile associated with the subscriber 114 from the CTS/PRS 104. In some embodiments, the VCS function 102 can then select the video trailer to present or offer to present to the subscriber 114 according to the user profile during a voice call or voice communication session. For example, the user profile associated with the subscriber 114 can indicate the subscriber 114 prefers documentary media content. The VCS function 102 can then select a video trailer associated with documentary media content, accordingly, to provide to the subscriber 114.

In one or more embodiments, the VCS function 102 access a group of user profiles from the CTS/PRS 104 and select a user profile from the group of user profiles according to the video trailer. Further the VCS function 102 can identify the communication device 112 associated with the subscriber 114 according to the selected user profile. For example, the VCS function 102 is instructed by media content provider personnel to provide a video trailer for romantic comedy media content. The VCS function 102 accesses the group of user profiles from the CTS/PRS 104 can analyzes media content preferences indicated in each of the user profiles and determines one or more user profiles that prefer romantic comedy media content. Further, the VCS function 102 can select a user profile that prefers romantic comedy media content and identify the communication device 112 associated with the selected profile to provide the video trailer of the romantic media content described herein.

In one or more embodiments, the VCS function 102 can select one or more video trailers according to a user profile associated to the subscriber. Further, the VCS function can instruct the CTS/PRS 104 to provide an option to view or available to view the one or more video trailers during a voice call, voice communication session, text message, email message, or social media message. The communication device 112 can provide user-generated input that provides a request or indicates a request to view a video trailer from the one or more video trailers. The VCS function 102 can then provide the video trailer for viewing to the communication device 112 as described herein.

FIG. 2A depicts an illustrative embodiment for a transition diagram of a system 200 for providing a video trailer for media content during a voice communication session. The system 200 can include a VCS function 202, a CTS/PRS 204, a MRF 206, a communication device 208 and a video application 210 executing on the communication device 208. The VCS function 202 is similar in functionality as the VCS function 102 in FIG. 1, the CTS/PRS 204 is similar in functionality as the CTS/PRS 104, the MRF 206 is similar in functionality as the MRF 106, and the communication device 208 is similarity in functionality as the communication device 112 in FIG. 1. In further embodiments, one, some or all of the VCS 202, CTS/PRS 204, and MRF 206 can be operated by a media content service provider. In some embodiments, the VCS function 202, CTS/PRS 204, and the MRF 206 can be integrated in one computing device. In other embodiments, the VCS function 202, CTS/PRS 204, and the MRF 206 can be distributed among one or more computing devices, individually, collectively, or in some combination. In further embodiments the communication device 208 can be a mobile phone, tablet computer, laptop computer, desktop computer, media device, or any other communication device.

In one or more embodiments, at transition 212, a scheduler function within the VCS function 2020 can select a particular subscriber number from a list of subscriber numbers. Further, transition 212, the VCS function invoke a click-to-dial API request that is sent to the CTS/PRS 204. The click-to-dial API indicates the VCS function 202 to be a first participant and the selected subscriber as the second subscriber of the voice call or voice communication session initiated by the CTS/PRS 204. At transition 214, the CTS/PRS 204 generates a SIP INVITE message toward the VCS function 204 and the VCS function 204 answer the incoming voice call or voice communication session initiated by the SIP INVITE. Further, at transition 216, the VCS function 202 sends a 200 OK message to the CTS/PRS 204 in response to the SIP invite indicating that the VCS function 202 can participate in the voice call or voice communication session. In addition, at transition, 218, the CTS/PRS 204 sends an acknowledgement of the 200 OK message to the VCS function 202. Also, at transition 220, the CTS/PRS 204 generates a SIP INVITE toward the communication device 208 using the click-to-dial API.

In one or more embodiments, at transition 222, the communication device 208 responds to the SIP INVITE with a 200 OK message that includes SDP information that indicates the audio codec and video codec for the communication device 208 to the CTS/PRS 204. At transition 224, the CTS/PRS 204 sends an acknowledgement of receipt of the 200 OK message that includes the SDP information. Further, at transition 226, the CTS/PRS 204 sends a SIP RE-INVITE message to the VCS function 204 that includes the SDP information (SDP information for communication device 208 which indicates the communication device 208 audio and video CODEC). Such a SIP RE-INVITE message is used to update the SDP information on an already established SIP session In addition, at transition 228, the VCS function 202 send a 200 OK message in response to receiving the SIP INVITE to the CTS/PR 204. Also, at transition 230, the CTS/PRS sends an acknowledgement of the 200 OK message. The exchange of SIP INVITE and 200 OK messages that include SDP information allows the generation of a real time protocol session between the VCS function 202 and the communication device 208. A real-time protocol session allows management of multimedia data between the VCS function 202, CTS/PRS 204, MRF 206, and/or media content server, and the communication device 208.

In one or more embodiments, at transition 232, the VCS function 202 generates an INVITE request message without SDP information towards the MRF 206. The INVITE request message includes a Uniform Resource Locator (URL) to a voice xml application. Further, this URL or another URL contained in this INVITE message or in another message exchanged between the VCS function 202 and the MRF 206 can contain the location of the video trailer. An example URL in the INVITE message can be sip:dialog@mrfc1.one.att.com; voicexml=http://att.com/videoCallSoln-Main.vxml. Further, at transition 234, the MRF can respond to the INVITE request with a 200 OK message that contain the SDP information of the MRF 206. In addition, at transitions 236 and 238, the VCS function can copy the MRF's SDP information and generate a re-INVITE message or an UPDATE SIP request with the SDP information for the MRF to the communication device 208. Also, at transitions 240 and 242, the communication device 208 sends a 200 OK messages via the CTS/PRS 204 to the VCS function 202 with the subscriber SDP information. Once the re-INVITE or UPDATE session is established, at transition 244, the VCS function sends an acknowledgement to the MRF 206 with the subscriber SDP information.

In one or more embodiments, at transition 246, the MRF 206 executes the voice XML logic such that the MRF proceeds to stream the video trailer to the communication device 208 after voice XML logic context in MRF 206 receives a confirmation from the communication device 208. After the video trailer is streamed to the communication device 208 and viewed by a subscriber, the subscriber is presented with IVR options by the voice XML logic to purchase the media content associated with the video trailer. In some embodiments, the subscriber can use IVR options to key-in the subscriber's payment information (e.g. credit card number, debit card number, etc.). In other embodiments, a media content provider application (which can be a video application and can be an application for any communication device 208 such as a mobile phone (e.g. smartphone) or tablet computer) can be launched on the communication device 208 remotely by the voice XML logic and the directed to display a media content purchase aspect of the video application 210. In additional embodiments, the voice XML logic can provide an option (using IVR, video application 210, or some other technology) to bill the media content purchase with the regular bill provided by media content provider. Further, at transition 248, receives user-generated input form the communication device 208 that can include voice recognition or DTMF inputs used in conjunction with IVR or other user generated input described herein to purchase the media content. In addition, at transition 250, the MRF 206 posts a request to the video application 210 API to download or have access to stream the purchased media content. Also, at transition 252, the video application 210 can provide an acknowledgement of the request to download or have access to be purchased media content.

In one or more embodiments, at transition 254, the MRF 206 sends a BYE message to the VCS 202, and, at transition 256, the VCS 202 sends a 200 OK message in response to the BYE message to discontinue the SIP communication session between the VCS 202, MRF 204, and communication device 206. Further, at transition 258, the VCS 202 sends a BYE message to the CTS/PRS 204, and, at transition 260, the CTS/PRS 204 sends a 200 OK message in response to the BYE message to discontinue the SIP communication session between the VCS 202, CTS/PRS 204, and communication device 206. In addition, at transition 262, the CTS/PRS 204 sends a BYE message to the communication device 208, and, at transition 264, the communication device 208 sends a 200 OK message in response to the BYE message to discontinue the SIP communication session between the CTS/PRS 204 and communication device 206.

Figure 2B:
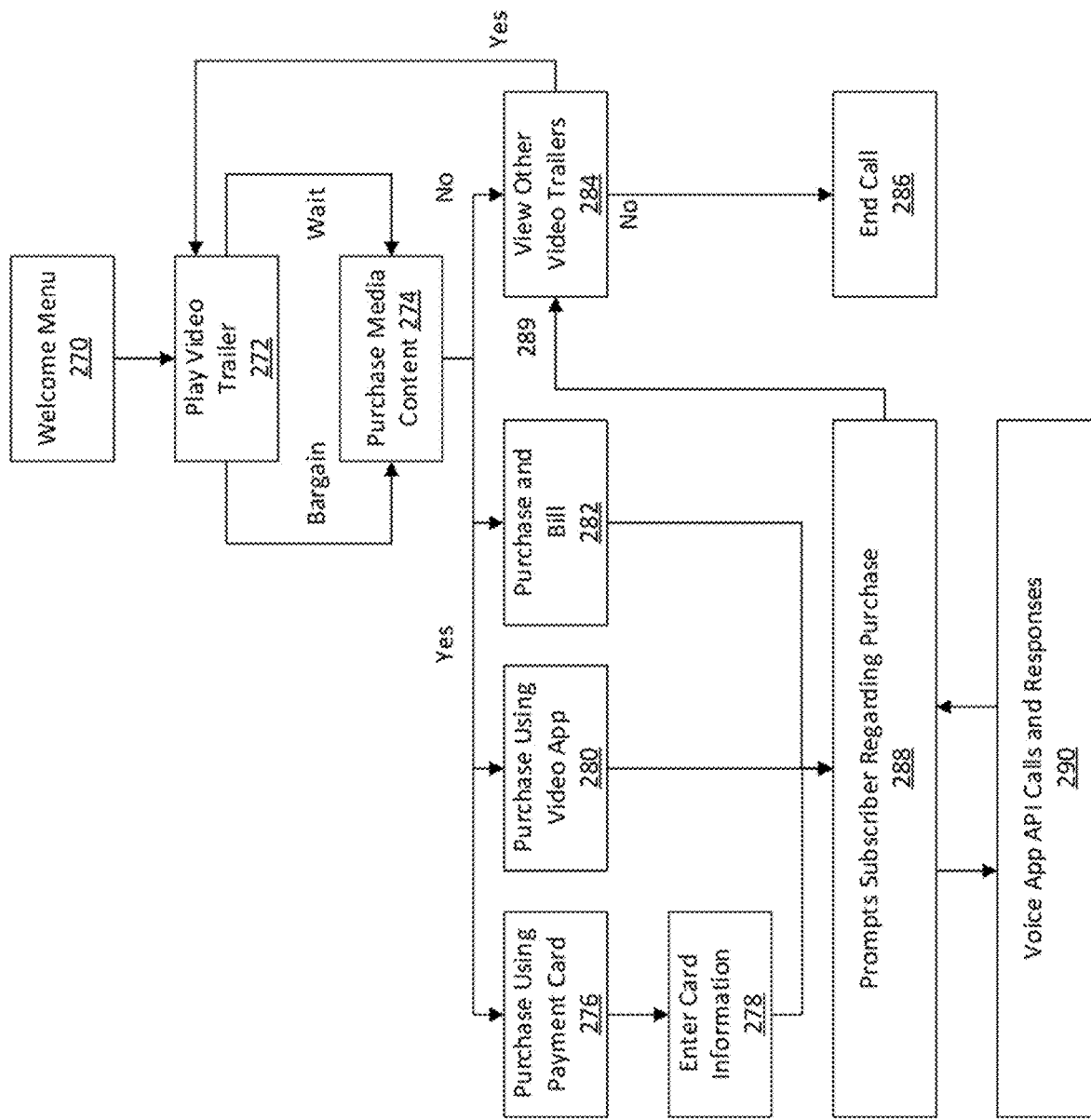
FIG. 2B depicts an illustrative embodiment for Voice XML logic of a system for providing a video trailer for media content during a voice communication session.

FIG. 2B depicts an illustrative embodiment for voice XML logic 265 of a system for providing a video trailer for media content during a voice communication session. In one or more embodiments, the voice XML logic 265 includes displaying, at 270, a Welcome Menu on a communication device. The Welcome Menu can be provided during a voice call or voice communication session through the use of IVR technology. Further, the voice XML logic includes, at 272, playing a video trailer associated with media content. In some embodiments, the voice XML logic can bargain on a price for purchasing the media content. In other embodiments, the voice XML logic can wait to provide purchase options or further viewing of other video trailers after the video trailer has completed being played. The voice XML logic, at 274, can provide a subscriber via the communication device with options to purchase the media content. If the subscriber selects to purchase the media content, then the subscriber can purchase the media content by supplying payment card information, i.e. providing a (credit card information, debit card information, etc.). Further, the voice XML logic, at 276, allows the subscriber to provide the payment card information. In addition, the voice XML logic, at 278, allows the subscriber to enter the payment card information including the payment card number. Alternately, the voice XML logic, at 280, allows the subscriber to purchase the media content using a video (mobile) application. As another alternative, the voice XML logic, at 282, allows the subscriber to purchase the media content and allows a media content provider to bill the subscriber later in time for the purchase. After selecting one of the above purchase embodiments (276 or 280 or 282), the voice XML logic, at 288, prompts the subscriber regarding the purchase being processed. During this time voice XML logic, exchanges API calls and responses with the media content provider's server at 290, to complete the purchase of the media content and prompts the subscriber with a confirmation of the media content purchase In one or more embodiments, if the subscriber does not want to purchase the media content (and in other embodiments, after purchasing media content 289), the voice XML logic, at 284, allows the subscriber to view other video trailers. Further, after the subscriber views other video trailers, the voice XML logic, at 286, ends the voice call or voice communication session.

Figure 3:
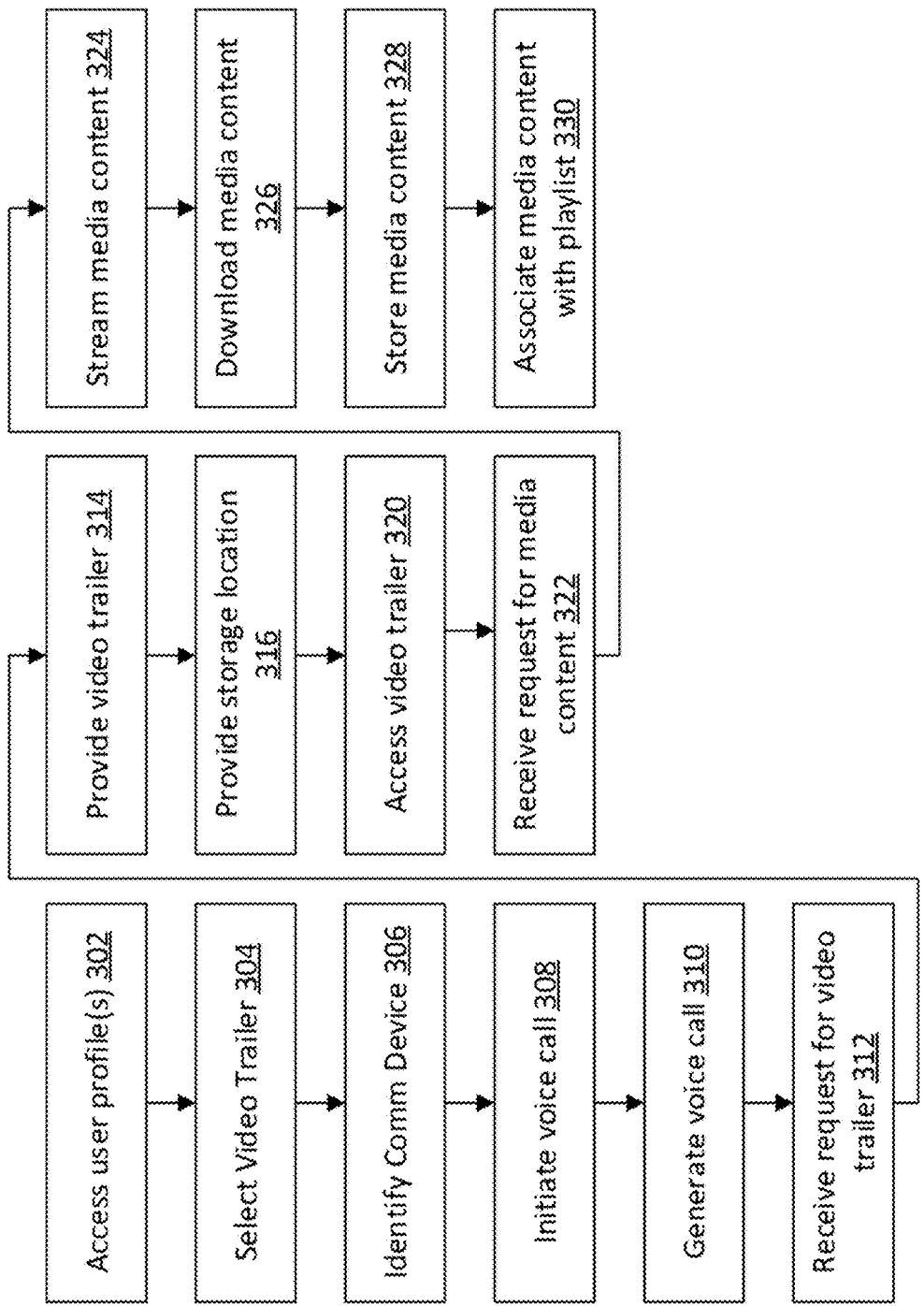
FIG. 3 depicts an illustrative embodiment of a method used in portions of the system described in FIGS. 1, 2A, and 2B.

FIG. 3 depicts an illustrative embodiment of a method 300 used in portions of the system described in FIGS. 1, 2A, and 2B. In one or more embodiments, aspects of the method 300 can be implemented by a VCS, CTS/PRS, MRF, media content server, and communication device, as described herein. The method 300 can include, at 302, a VCS accessing one or more user profiles from a CTS/PRS. Each user profile can be associated with a subscriber. Further, the method 300 can include, at 304, the VCS selecting a video trailer to provide to a subscriber according to a user profile and/or the preferences for media content listed in the user profile. In some embodiments, the method 300 select a video trailer to provide to a subscriber and then access a group user profiles from a CTS, select a user profile from the group of user profiles according to the selected video trailer based on the media content preferences listed in the user profiles. In addition, the method 300 can include, at 306, identifying a communication device associated with the subscriber according to the selected user profile. That is, the user profile can list identification information for the communication device that can be used provide the video trailer to the subscriber.

In one or more embodiments, the method 300 can include, at 308, the VCS initiating a voice call or voice communication session to the subscriber (of a media content service). The voice call or voice communication session indicates a video trailer for the media content is available for viewing by the subscriber. The voice call or voice communication can be initiated using a click-to-dial API with the CTS/PRS by the VCS. Further, the method 300 can include, at 310, the CTS/PRS generating the voice call or voice communication session in response to instructions received from the VCS. The CTS is a network element of an IP Multimedia Subsystem that provides call processing services for the VCS function. The PRS conforms to a Restful Network API standard that includes the click-to-dial application programming interface. In addition, the method 300 can include, at 312, the VCS receiving via the CTS/PRS a first request to present the video trailer for the media content from the communication device of the subscriber. The first request is sent by the communication device in response to receiving user-generated input that indicates a request to view the video trailer. The user-generated input can be provided using IVR technology, or a touchscreen, keyboard, or mouse of the communication device, or a combination thereof. Also, the method 300 can include, at 314, the VCS providing the video trailer to the communication device. In some embodiments, a group of video trailers can be provided to the communication device to be viewed by the subscriber.

In one or more embodiments, the providing of the video trailer of the method 300 can include, at 316, the VCS providing a storage location of the video trailer and/or the media content to the MRF. The VCS can provide the storage location by sending a SIP request that include an URL that indicates the storage location of the video trailer and/or the media content.

In one or more embodiments, the method 300 can include, at 320, the MRF can access or can direct a media content server to access the video trailer from the storage location indicated by the VCS (e.g. the storage location indicated by a URL). The MRF can then provide or cause to present the video trailer on the communication device. In some embodiments, the MRF can send or cause to send an email message, text message, or social media message to the communication device and the email message, text message, or social media message includes a URL link, when selected by a subscriber, accesses the video trailer. Further, the method 300 can include, at 322, the MRF receiving a second request to purchase, view, or otherwise access the media content. (viewing and accessing media content, in some embodiment, is conducted between the communication device and media content server) That is, the MRF provides the video trailer to the communication device, and the MRF further provides the media content responsive to receiving the second request after viewing the video trailer. In addition, the method 300 can include, at 324, the MRF or the MRF causing the media content server to stream the media content to the communication device. Also, the method 300 can include, at 326, the MRF or the MRF causing the media content server to download the media content to the communication device. Further, the method 300 can include, at 328, in some embodiments, the MRF or the MRF causing the media content server to store the media content to a digital video recorder (DVR) or some other storage device associated with the communication device. In other embodiments, the media provider mobile application (or video application described herein) or set top box can cause the media content server to store the media content to a DVR. In addition, the method 300 can include, at 330, the MRF or the MRF causing the media content server to associate the media content with a playlist or wishlist, the media content listed on which is accessible to the communication device.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Embodiments described herein and portions thereof can be combined with other embodiments or portions thereof.

Figure 4:
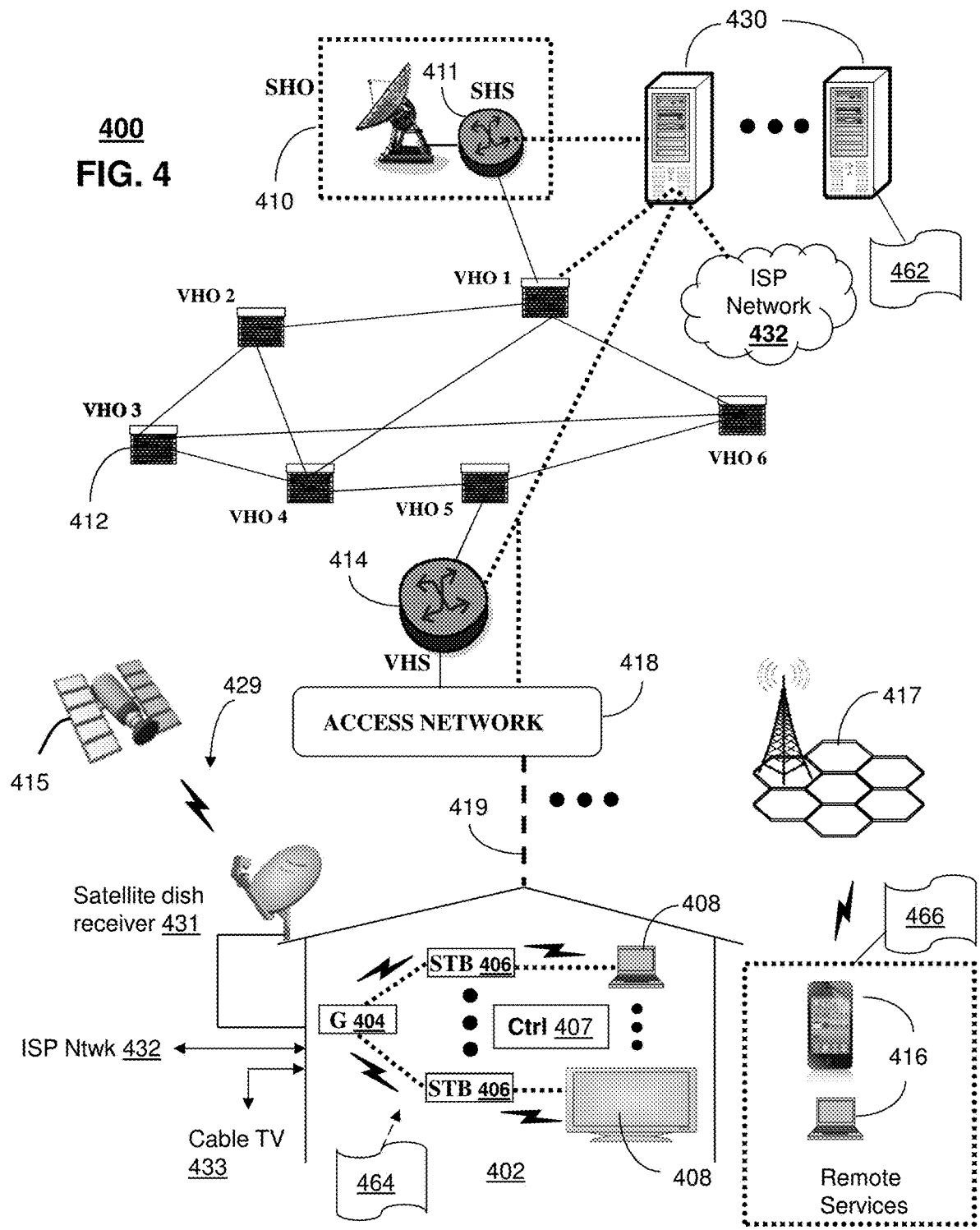
FIGS. 4-5 depict illustrative embodiments of communication systems that provide a video trailer for media content during a voice communication session.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100 and 200 of FIGS. 1 and/ 2A as another representative embodiment of communication system 400. For instance, one or more devices illustrated in the communication system 400 of FIG. 4 can include embodiments initiating a voice call to a subscriber of a media content service. The voice call indicates a video trailer for media content is available for viewing by the subscriber. Further embodiments can include receiving a first request to present the video trailer for the media content in response to the voice call. Additional embodiments can include providing the video trailer to a communication device. Other embodiments are disclosed.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a VCS/CTS/PRS/MRF (herein referred to as video trailer service node 430). The video trailer service node 430 can use computing and communication technology to perform function 462, which can include among other things, the techniques described by method 265 and 300 of FIGS. 2B and 3. For instance, function 462 of video trailer service node 430 can be similar to the functions described for functions 102, 104, 106, 202, 204, 206 of FIGS. 1-2A in accordance with methods 265 and 300. The media processors 406 and wireless communication devices 416 can be provisioned with software functions 464 and 466, respectively, to utilize the services of video trailer service node 430. For instance, functions 464 and 466 of media processors 406 and wireless communication devices 416 can be similar to the functions described for the communication devices 112 and 208 of FIGS. 1-2A in accordance with methods 265 and 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
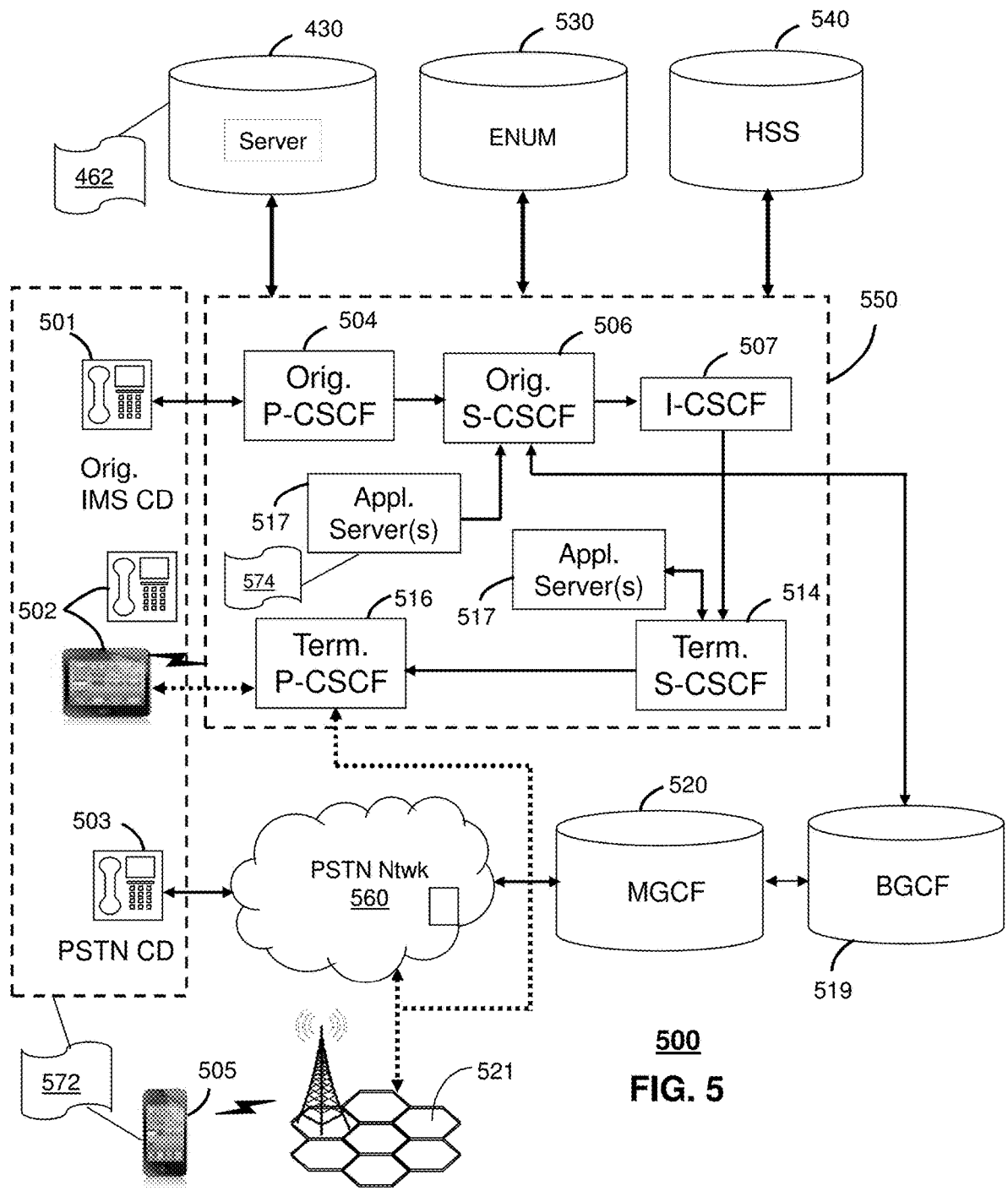

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 and 200 of FIGS. 1 and 2A and communication system 400 as another representative embodiment of communication system 400. Embodiments can include receiving, a storage location for a video trailer and media content at a video trailer service node that includes a MRF. Further embodiments can include providing, by the MRF, the video trailer in response to receiving a first user-generated input. The first user-generated input is provided by a communication device in voice communication with a converged telephony server (CTS). The voice communication indicates the video trailer for media content is available for viewing by a subscriber. The first user-generated input includes first request for the video trailer.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The video trailer service node 430 of FIG. 4 can be operably coupled to communication system 500 for purposes similar to those described above. Video trailer service node 430 can perform function 462 and thereby provide video trailer services to the CDs 501, 502, 503 and 505 of FIG. 5 similar to the functions described for computing devices 102, 104, 106, 202, 204, 260 of FIGS. 1-2A in accordance with methods 265 and 300 of FIGS. 2B and 3. CDs 501, 502, 503 and 505, which can be adapted with software to perform function 572 to utilize the services of the video trailer service 430 similar to the functions described for communication devices 112 and 208 of FIGS. 1 and 2A in accordance with methods 265 and 300 of FIGS. 2B and 3. Video trailer service node 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
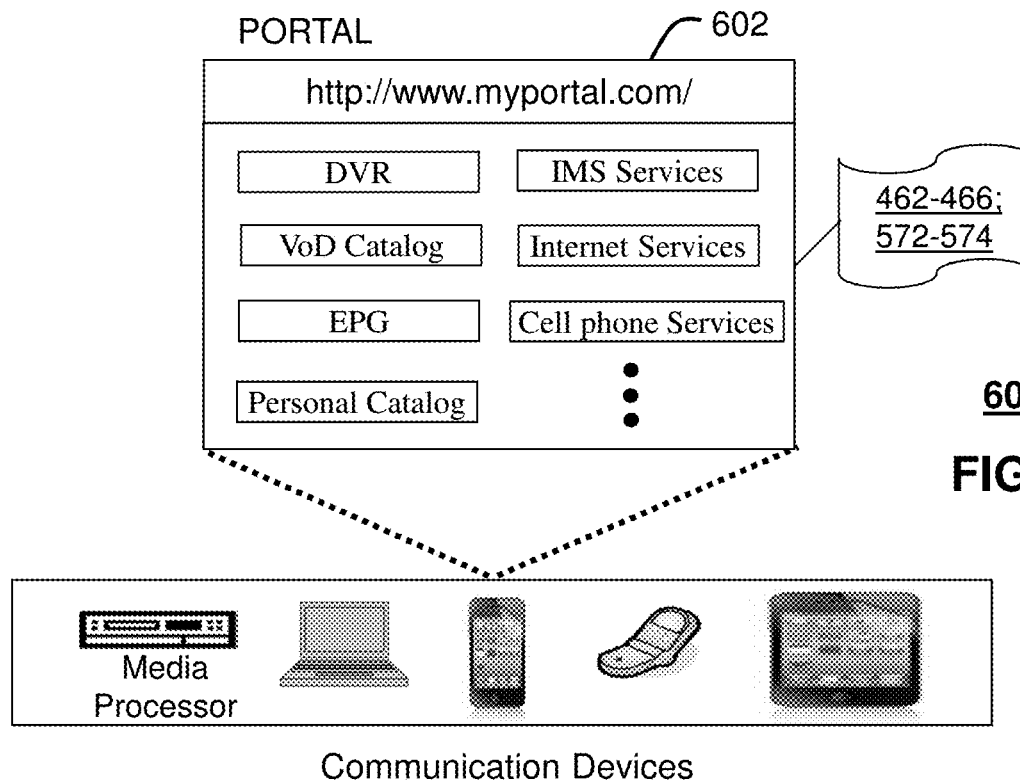
FIG. 6 depicts an illustrative embodiment of a web portal for interacting with the communication systems that provide a video trailer for media content during a voice communication session.

FIG. 6 depicts an illustrative embodiment of a web portal 602 of a communication system 600. Communication system 600 can be overlaid or operably coupled with systems 100 and 200 of FIGS. 1 and 2A, communication system 400, and/or communication system 500 as another representative embodiment of systems 100 and 200 of FIGS. 1 and 2A, communication system 400, and/or communication system 500. The web portal 602 can be used for managing services of systems 100 and 200 of FIGS. 1 and 2A and communication systems 400-500. A web page of the web portal 602 can be accessed by a Uniform Resource Locator (URL) with an Internet browser using an Internet-capable communication device such as those described in FIGS. 1 and 2A and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100 and 200 of FIGS. 1 and 2A, and communication systems 400-500. For instance, users of the services provided by computing devices 102, 104, 106, 202, 204, 206 and video trailer service node 430 can log into their on-line accounts and provision video trailer service node 430 and select or download one or more video trailers to be viewed by subscribers, configure or input the storage location (i.e. URL) of the video trailers and the media content associated with each video trailer, user profiles of subscribers, and so on. Service providers can log onto an administrator account to provision, monitor and/or maintain the systems 100 and 200 of FIGS. 1 and 2A or video trailer service node 430.

Figure 7:
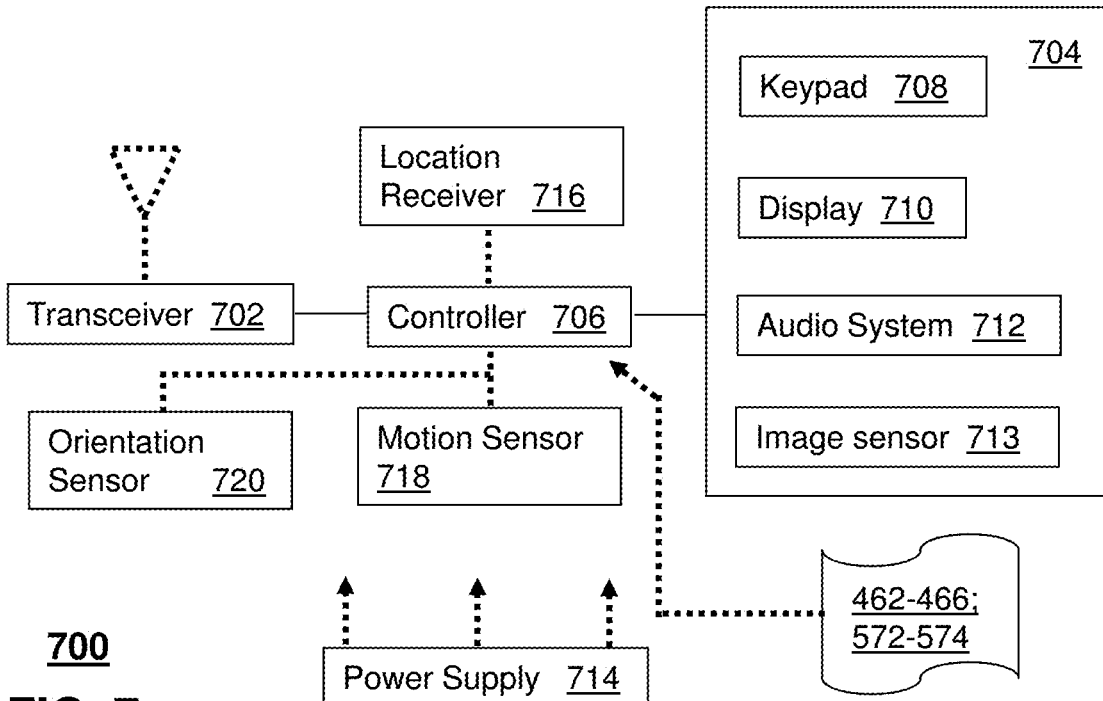
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2A, and FIGS. 4-5 and can be configured to perform portions of methods 265 and 300 of FIGS. 2B and 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of computing devices 102, 104, 106, 108, 112, 202, 204, 206, 208 of FIGS. 1 and 2A, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100 and 200 of FIGS. 1 and 2A, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, portions or entire embodiments can be combined with portions or entire other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
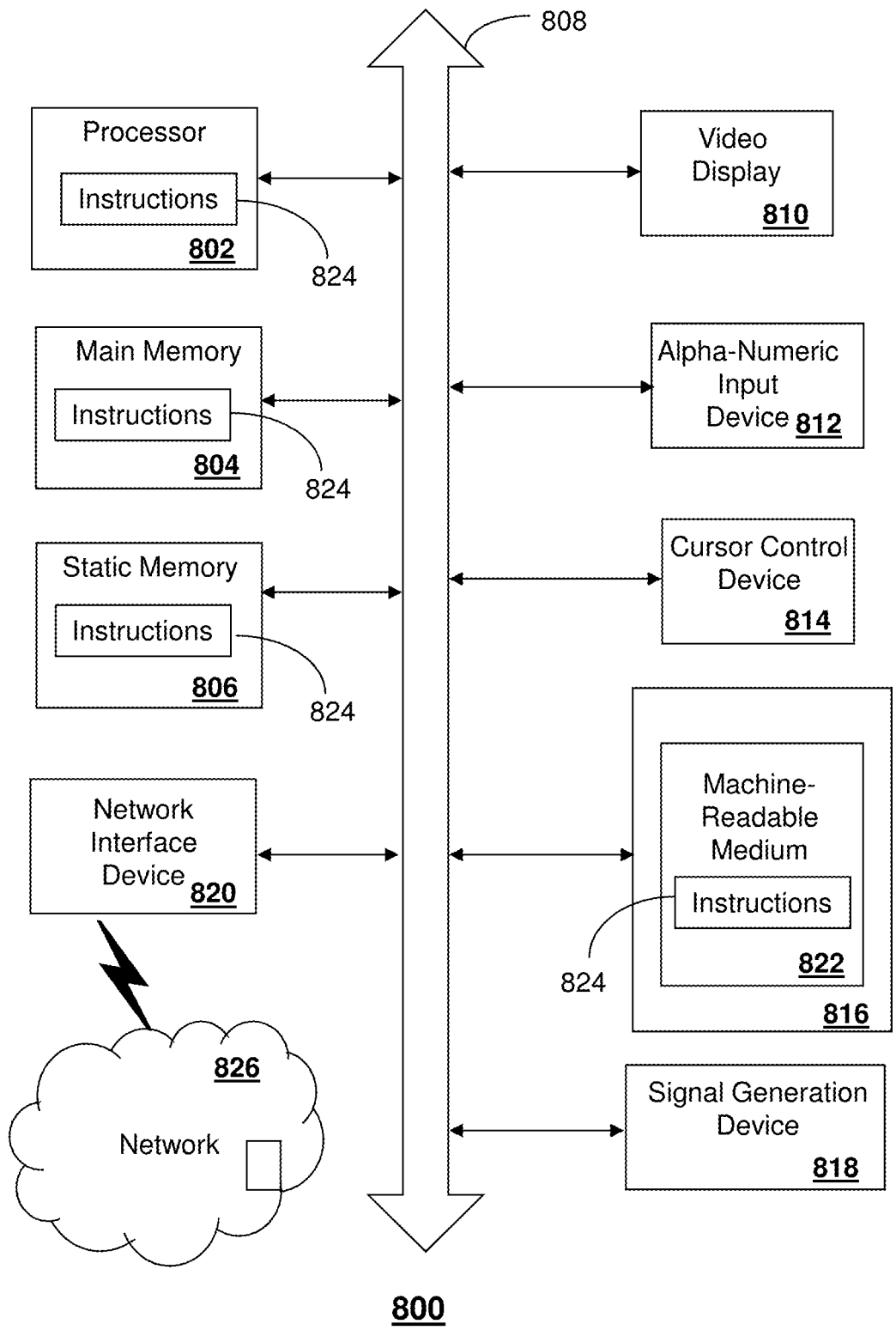
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the video trailer service node 430, the media processor 406, and computing devices 102, 104, 106, 108, 112, 202, 204, 206, 208 and their functions described herein and other devices of FIGS. 1-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A device, comprising:
   a processing system including a processor; and
   a memory that stores executable instructions that, when executed by the processing system, facilitate performance of operations, comprising:

accessing a plurality of user profiles stored in an information repository, wherein each of the plurality of user profiles is associated with each of a plurality of subscribers;

identifying a media content preference listed in each of the plurality of user profiles resulting in a plurality of media content preferences;

selecting a user profile from the plurality of user profiles resulting in a selected user profile according to the plurality of media content preferences and a video trailer for media content, wherein the selected user profile is associated with a subscriber;

identifying a communication device associated with the subscriber according to identification information for the communication device listed in the selected user profile;

initiating a voice call, via a converged telephony server (CTS), to the communication device utilized by the subscriber of a media content service, wherein the voice call indicates the video trailer is available for viewing by the subscriber;

receiving a first request from the communication device associated with the subscriber to present the video trailer in response to the voice call, via the CTS, wherein the first request comprises voice input from the subscriber;

providing a message to the communication device in response to detecting the voice input using a voice recognition technique to present the video trailer, wherein the message includes a Uniform Resource Locator (URL) link for the video trailer;

receiving a second request from the communication device associated with the subscriber to store the media content in a digital video recorder (DVR), wherein the second request includes second voice input, wherein the second request includes payment information to purchase the media content; and storing the media content in the DVR in response to confirming the purchase of the media content according to the payment information, wherein the communication device accesses the media content from the DVR to view the media content on the communication device.

2. The device of claim 1, wherein the CTS is a network element of an IP Multimedia Subsystem that provides call processing services to the device.

3. The device of claim 1, wherein the initiating of the voice call comprises initiating the voice call using a click-to-dial application programming interface (API) with a parlay rest server by a video call solution function operated by the device, wherein the parlay rest server conforms to a Restful Network API standard that includes the click-to-dial application programming interface.

4. The device of claim 1, wherein the first request is provided to a media resource function operated by another device, in response to a CTS receiving user-generated input, wherein the user-generated input requests the video trailer.

5. The device of claim 1, wherein the providing of the video trailer comprises providing a storage location for the video trailer and the media content to another device operating a media resource function, wherein the media resource function of the other device provides the video trailer to the communication device, wherein the media resource function further provides the media content responsive to receiving the second request after viewing the video trailer.

6. The device of claim 5, wherein the providing the storage location comprises sending a session-initiated-protocol (SIP) request to the media resource function, and wherein the SIP request includes the URL link indicating the storage location for the video trailer and the media content.

7. The device of claim 1, wherein the selecting of the user profile comprises selecting of the user profile from the plurality of user profiles according to the plurality of media content preferences and a group of video trailers.

8. The device of claim 7, wherein the providing of the message comprises providing of the message to the communication device, wherein the message comprises a group of URL links, wherein each of the group of URL links is associated with each of the group of video trailers.

9. The device of claim 1, wherein the message comprises one of an email message, text message, and social media message.

10. A non-transitory machine-readable storage medium, comprising executable instructions that, when executed by a processing system including a processor, facilitate performance of operations, comprising:

receiving, at a communication device associated with a subscriber, a voice call via a converged telephony server (CTS) from a video call solution function operated by a first computing device, wherein the voice call indicates one or more video trailers is available for viewing by the subscriber, wherein the CTS is a network element of an IP Multimedia Subsystem that provides call processing services, wherein the first computing device accesses a plurality of user profiles stored in an information repository, wherein the first computing device identifies a media content preference listed in each of the plurality of user profiles resulting in a plurality of media content preferences, selecting a user profile from the plurality of user profiles resulting in a selected user profile according to the plurality of media content preferences and the one or more video trailers, wherein the selected user profile is associated with the subscriber, wherein the first computing device identifies the communication device according to identification information for the communication device listed in the selected user profile;

providing first user-generated input from the communication device to a media resource function that includes a first request from the communication device associated with the subscriber to present a video trailer for media content from the one or more video trailers on the communication device, wherein the media resource function is operated by a second computing device, wherein the first user-generated input comprises voice input from the subscriber;

receiving a message at the communication device, wherein the message includes a Uniform Resource Locator (URL) link for the video trailer, wherein the message is provided to the communication device in response to detecting the voice input using a voice recognition technique;

presenting the video trailer on the communication device;

providing second user-generated input from the communication device to the media resource function that includes a second request from the communication device associated with the subscriber to store the media content in a digital video recorder (DVR), wherein the second request includes second voice input, wherein the second request includes payment information to purchase the media content; and storing the media content in the DVR in response to confirming the purchase of the media content according to the payment information, wherein the communication device accesses the media content from the DVR to view the media content on the communication device.

11. The non-transitory machine-readable storage medium of claim 10, wherein the providing of the first user-generated input comprises providing the first user-generated input using one of interactive voice recognition (IVR), touchscreen, keyboard, mouse, or combination thereof.

12. The non-transitory machine-readable storage medium of claim 10, wherein the operations comprise providing third user-generated input, wherein the third user-generated input includes a third request for accessing the media content.

13. The non-transitory machine-readable storage medium of claim 10, wherein the operations comprise receiving the media content as a streaming video content.

14. The non-transitory machine-readable storage medium of claim 10, wherein the operations comprise downloading the media content onto the communication device.

15. The non-transitory machine-readable storage medium of claim 10, wherein the operations comprise associating the media content with a playlist for a user associated with the communication device.

16. A method, comprising:
receiving, by a processing system including a processor, a storage location for a video trailer and media content, wherein the processing system includes and operates a media resource function, wherein a first computing device accesses a plurality of user profiles stored in an information repository, wherein the first computing device identifies a media content preference listed in each of the plurality of user profiles resulting in a plurality of media content preferences, selecting a user profile from the plurality of user profiles resulting in a selected user profile according to the plurality of media content preferences and the video trailer, wherein the selected user profile is associated with a subscriber, wherein the first computing device identifies a communication device associated with the subscriber according to identification information for the communication device listed in the selected user profile, wherein the first computing device provides the storage location for video trailer to the communication device;
providing, by the processing system, the video trailer in response to receiving a first user-generated input, wherein the first user-generated input comprises voice input of the subscriber, wherein receiving the first user-generated input comprises detecting the voice input using a voice recognition technique, wherein the first user-generated input is provided by the communication device in response to the communication device receiving a message, wherein the message includes a Uniform Resource Locator (URL) link for the video trailer, wherein the communication device is in voice communication with a converged telephony server (CTS), wherein the voice communication indicates the video trailer for the media content is available for viewing by the subscriber, and wherein the first user-generated input includes a first request from the communication device associated with the subscriber for the video trailer, wherein the CTS is a network element of an IP Multimedia Subsystem that provides call processing services; and
responsive to receiving, by the processing system, a second request from the communication device associated with the subscriber to store the media content, storing, by the processing system, the media content in a digital video recorder (DVR) in response to confirming a purchase of the media content according to payment information, wherein the second request includes second voice input, wherein the second request includes the payment information to purchase the media content, wherein the communication device accesses the media content from the DVR to view the media content on the communication device.

17. The method of claim 16 wherein the second request is provided by a mobile application on the communication device.

18. The method of claim 17, comprising initiating, by the processing system, streaming of the media content to the communication device.

19. The method of claim 17, comprising initiating downloading of the media content to the communication device.

20. The method of claim 17, comprising associating the media content with a playlist for a user associated with the communication device.

* * * * *